US010975219B2

(12) United States Patent
Jang et al.

(10) Patent No.: US 10,975,219 B2
(45) Date of Patent: Apr. 13, 2021

(54) AUTOMOBILE INTERIOR AND EXTERIOR MATERIALS COMPRISING LOW MELTING POLYESTER RESIN AND METHODS FOR PRODUCING SAME

(71) Applicant: HUVIS CORPORATION, Seoul (KR)

(72) Inventors: Boo-Kyeong Jang, Daejeon (KR); Hyun-Wook Shin, Daejeon (KR); Seong-Yoon Park, Daejeon (KR); Yo-Seung Ho, Daejeon (KR)

(73) Assignee: Huvis Corporation, Seoul (KR)

( * ) Notice: Subject to any disclaimer, the term of this patent is extended or adjusted under 35 U.S.C. 154(b) by 0 days.

(21) Appl. No.: 15/778,340

(22) PCT Filed: Sep. 8, 2016

(86) PCT No.: PCT/KR2016/010067
§ 371 (c)(1),
(2) Date: May 23, 2018

(87) PCT Pub. No.: WO2018/021615
PCT Pub. Date: Feb. 1, 2018

(65) Prior Publication Data
US 2018/0346681 A1 Dec. 6, 2018

(30) Foreign Application Priority Data
Jul. 29, 2016 (KR) .................. 10-2016-0096878

(51) Int. Cl.
D04H 1/55 (2012.01)
C08L 67/02 (2006.01)
C08G 63/183 (2006.01)
C08G 63/672 (2006.01)
B32B 5/02 (2006.01)
B32B 5/24 (2006.01)
C08J 5/12 (2006.01)
C08J 9/36 (2006.01)
D04H 1/541 (2012.01)
D01F 6/84 (2006.01)
B32B 5/18 (2006.01)
D01D 5/34 (2006.01)
D01F 8/14 (2006.01)

(52) U.S. Cl.
CPC ............... *C08J 9/36* (2013.01); *B32B 5/022* (2013.01); *B32B 5/18* (2013.01); *B32B 5/245* (2013.01); *C08G 63/183* (2013.01); *C08G 63/672* (2013.01); *C08J 5/121* (2013.01); *C08L 67/02* (2013.01); *D01D 5/34* (2013.01); *D01F 6/84* (2013.01); *D01F 8/14* (2013.01); *D04H 1/541* (2013.01); *D04H 1/55* (2013.01); B32B 2250/03 (2013.01); B32B 2250/40 (2013.01); B32B 2262/0284 (2013.01); B32B 2262/12 (2013.01); B32B 2262/14 (2013.01); B32B 2266/0264 (2013.01); B32B 2307/102 (2013.01); B32B 2307/51 (2013.01); B32B 2307/72 (2013.01); B32B 2605/00 (2013.01); *C08J 2367/02* (2013.01); *C08J 2467/02* (2013.01); *C08L 2205/025* (2013.01); *C08L 2205/16* (2013.01); *D10B 2331/04* (2013.01); D10B 2505/12 (2013.01)

(58) Field of Classification Search
CPC . B32B 5/245; B32B 2250/03; B32B 2250/40; B32B 2262/0284; B32B 2605/00; Y10T 442/697; Y10T 442/692; Y10T 442/637; Y10T 442/684; Y10T 442/641; Y10T 442/638; D04H 1/435; D04H 1/541; D04H 3/14; D04H 1/55; D04H 3/011; D04H 1/43835; D04H 3/153; D04H 5/06; C08L 67/03; D10B 2505/12; D10B 2331/04
USPC .................. 442/274, 403, 411, 415
See application file for complete search history.

(56) References Cited

U.S. PATENT DOCUMENTS

| 4,065,439 A | 12/1977 | Uno et al. |  |
|---|---|---|---|
| 4,129,675 A | 12/1978 | Scott |  |
| 4,381,379 A * | 4/1983 | Toga | C08G 63/183 525/437 |
| 4,415,727 A * | 11/1983 | Toga | C08G 63/183 264/523 |
| 5,880,225 A * | 3/1999 | Yang | C08G 18/4213 525/437 |
| 5,916,677 A * | 6/1999 | Chen | C08G 63/183 264/176.1 |

(Continued)

FOREIGN PATENT DOCUMENTS

| CN | 105155034 | * 12/2015 | ............... D01F 8/14 |
| KR | 10-0295573 | 7/2001 | |

(Continued)

OTHER PUBLICATIONS

Machine translation of Qiu CN 105155034 (Year: 2018).*

(Continued)

Primary Examiner — Laura C Powers
Assistant Examiner — Larissa Rowe Emrich
(74) Attorney, Agent, or Firm — Meunier Carlin & Curfman LLC

(57) ABSTRACT

Provided are an automobile interior/exterior material including a low-melting-point polyester resin fiber layer, and a method of manufacturing the same. More particularly, an automobile interior/exterior material having excellent processability and price competitiveness without deterioration of properties, such as strength and durability, is provided.

9 Claims, No Drawings

(56) References Cited

U.S. PATENT DOCUMENTS

| | | | |
|---|---|---|---|
| 6,414,085 B1* | 7/2002 | Karas | C08G 63/54 525/168 |
| 6,648,926 B1* | 11/2003 | Immediate | D06C 7/02 442/182 |
| 2005/0282005 A1* | 12/2005 | Wu | B29C 65/04 428/357 |
| 2008/0299367 A1 | 12/2008 | Yamamoto | |
| 2011/0136951 A1* | 6/2011 | Kitano | B29C 47/0011 524/109 |
| 2014/0027200 A1* | 1/2014 | Mori | G10K 11/168 181/294 |
| 2016/0222557 A1* | 8/2016 | Jarre | D04H 1/435 |
| 2017/0246775 A1* | 8/2017 | Jonza | B32B 5/02 |

FOREIGN PATENT DOCUMENTS

| | | |
|---|---|---|
| KR | 20-0228830 | 12/2001 |
| KR | 10-1183146 | 9/2012 |
| KR | 10-1272551 | 6/2013 |
| KR | 10-2014-0136695 | 12/2014 |
| KR | 20140136695 | 12/2014 |
| KR | 1020140136695 | 12/2014 |
| WO | WO-0006375 A1 * | 2/2000 ............... B32B 5/24 |

OTHER PUBLICATIONS

Machine Translation CN 105155034 (Qiu) (Year: 2015).*
Extended European Search Report dated Dec. 13, 2018 for EP Application No. 16910637.4, 6 pages.
Office Action issued by the Korean Intellectual Property Office for Korean Application No. 10-2016-0096878 on Jan. 19, 2018.
Decision to Grant issued by the Korean Intellectual Property Office for Korean Application No. 10-2016-0096878 dated Jun. 20, 2018.
Granted claims, an English translation of the granted claims, and a statement of accuracy of the English translation of the granted claims by the Korean Intellectual Property Office for Korean Application No. 10-2016-0096878.
English Translation of International Search Report dated Apr. 19, 2017, from International Application No. PCT/KR2016/010067, 13 pages.
Anonymous: "Kunststoffe—Dynamische Differenz—Thermoanalyse (DSC)—Teil 3: Bestimmung der Schmelz—und Kristallisationstemperatur und der Dristallisationsenthalpie (ISO 11357-3:2011); Deutsche Fassung EN ISO 11357-3:2013", Apr. 1, 2013, pp. 1-6.
ASTM D3418-08 Standard Test Method for Transition Temperatures and Enthalpies of Fusion and Crystallization of Polymers by Differential Scanning Calorimetry, Jan. 1, 2008, ASTM International.
Astm, "ASTM D3642: Softening Point of Certain Alkali-Soluble Resins", Oct. 31, 2013, XP055639109, West Conshohocken, PA.
Astm, ASTM E-1545: Assignment of the Glass Transition Temperature by Thermomechanical Analysis:, Sep. 30, 2016, XP055639122, West Conshohocken, PA.
Office Action dated Nov. 12, 2019 in European Application No. 16 910 637.4 (6 pages).

* cited by examiner

AUTOMOBILE INTERIOR AND EXTERIOR MATERIALS COMPRISING LOW MELTING POLYESTER RESIN AND METHODS FOR PRODUCING SAME

TECHNICAL FIELD

The present invention relates to an automobile interior/exterior material including a low-melting-point polyester resin and a method of manufacturing the same.

BACKGROUND ART

Automobile interior/exterior materials, particularly interior materials, are required to have characteristics such as light weight, buffering properties, heat insulation, moldability, high strength, and energy saving effects. Conventionally, a low-melting-point fiber was used as an automobile interior material. A low-melting-point resin, which is an adhesive fiber which melts at a lower temperature of 100 to 200° C. than the temperature of 265° C. or more at which general polyester fiber melts, is an eco-friendly material not requiring a chemical adhesive, and has an advantage of easy construction. By attaching a laminate, which includes a substrate layer made of a thermoplastic resin, a soft polyurethane foam layer, and a fiber layer, to such a low-melting-point resin fiber layer, durability may be improved and the manufacturing cost per volume may be lowered. In addition, an automotive interior material having a small dimensional change rate and an excellent sound absorption rate may be obtained.

However, when the laminate includes a soft polyurethane foam layer, the thickness of the laminate increases to meet required properties of an automobile interior/exterior material and a large amount of adhesive is used to compound different materials in a manufacturing process. Accordingly, the amount of VOCs increases and the laminate is not recycled.

Therefore, there is a need for an automobile interior/exterior material having superior processability and being capable of lowering manufacturing costs.

RELATED ART DOCUMENTS

Patent Documents

US Patent Laid-Open Publication No. 4,129,675
US Patent Laid-Open Publication No. 4,065,439

DISCLOSURE

Technical Problem

Therefore, the present invention has been made in view of the above problems, and it is one object of the present invention to provide an automobile interior/exterior material having excellent processability and price competitiveness.

Technical Solution

One aspect of the present invention provides an automobile interior/exterior material, including a fiber layer that includes a first polyester resin fiber having a melting point of 180° C. to 250° C. or a softening point of 100° C. to 150° C.; and a second polyester resin fiber having a melting point higher than 250° C., wherein a mixing ratio between the first and second polyester resin fibers constituting the fiber layer is 1:9 to 9:1 by weight, and fibers forming the fiber layer are partially fused.

Another aspect of the present invention provides a method of manufacturing an automobile interior/exterior material, the method including a step of thermoforming a fiber layer including 10 to 90 parts by weight of a first polyester resin fiber having a melting point of 180° C. to 250° C. or a softening point of 100° C. to 150° C.; and 90 to 10 parts by weight of a second polyester resin fiber having a melting point of 255° C. or more at 80 to 200° C.

Advantageous Effects

Since an automobile interior/exterior material according to the present invention is manufactured using a low-melting-point polyester resin, excellent processability may be realized without deterioration of properties such as strength and durability. In addition, manufacturing costs may be lowered by using the low-melting-point polyester resin.

BEST MODE

As the invention allows for various changes and numerous embodiments, particular embodiments are illustrated in the drawings and described in detail in the written description.

However, this is not intended to limit the present invention to particular modes of practice, and it is to be appreciated that all changes, equivalents, and substitutes that do not depart from the spirit and technical scope of the present invention are encompassed in the present invention.

In the present invention, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

In addition, the expression "parts by weight," used in the present invention, refers to a weight ratio between ingredients.

In addition, the expression "moles," used in the present invention, refers to a mole fraction between components.

In addition, the expression "melting point," used in the present invention, refers to a temperature at which a solid resin begins to melt.

Further, the expression "polymer", used in the present invention, refers to an oligomer and/or polymer prepared by polymerizing a compound including a monomer or a polymerizable reactive group.

Hereinafter, the present invention is described in more detail.

The present invention provides an automobile interior/exterior material including a low-melting-point polyester resin fiber layer.

In an embodiment, the automobile interior/exterior material according to the present invention includes a fiber layer including a first polyester resin fiber having a melting point of 180° C. to 250° C. or a softening point of 100° C. to 150° C.; and a second polyester resin fiber having a melting point higher than 250° C.

The first polyester resin fiber included in the fiber layer is a fiber formed of a polyester resin having a melting point of 180° C. to 250° C. or a softening point of 100° C. to 150° C. In a relative sense, the first polyester resin fiber is also referred to as a low-melting-point polyester resin fiber. In addition, the second polyester resin fiber is a polyester resin fiber having a melting point higher than 250° C. and, in a relative sense, is also referred to as a high-melting-point polyester resin fiber.

The fiber layer is manufactured by mixing the first polyester resin fiber with the second polyester resin fiber. A mixing ratio of the first polyester resin fiber to the second polyester resin fiber may be controlled to be 1:9 to 9:1 by weight. As needed, the mixing ratio may be 1:9 to 7:3, or 1:9 to 5:5. By mixing the low-melting-point polyester resin fiber with the high-melting-point polyester resin fiber, strength may be reinforced while increasing adhesion among fibers. In particular, the content of the low-melting-point polyester resin fiber may be controlled to be equal to or lower than that of the high-melting-point polyester resin fiber. For example, the high-melting-point polyester resin may have a melting point higher than 250° C. and, more particularly, may have a melting point of 251 to 260° C. The high-melting-point polyester resin is commercially available. For example, a product (product name: SD, Semi-dull chip) manufactured by Huvis Inc. may be used.

In particular, the shape, thickness, and laminated structure of the fiber layer are not specifically limited and, for example, fibers forming the fiber layer may be partially fused. With regard to the mutually fused shape of the fibers, heat and/or pressure is applied to the fibers in a process of forming a fiber layer through thermoforming and, through this process, the fibers are partially fused. Since the fiber layer according to the present invention includes a low-temperature fusible fiber made of a low-melting-point polyester resin, partially-fused fibers may be formed through low-temperature molding.

In another embodiment, the fiber layer may further include a functional additive as needed. For example, as the functional additive, a flame retardant, a thickener, an inorganic filler, etc. may be added in a small amount.

In an embodiment, the automobile interior/exterior material according to the present invention does not include glass fiber. The glass fiber includes all of glass flakes, other powdered glass, etc. In particular, the expression "does not include glass fiber" used in the present invention refers to the case wherein glass fiber is included in an amount of 1% by weight or less or the case wherein glass fiber is not substantially included. Accordingly, the automobile interior/exterior material according to the present invention may prevent generations of glass dust during work and may increase working efficiency.

In another embodiment, the automobile interior/exterior material has a sound absorption rate, as measured according to KS F 2805, of 0.4 NRC or more and/or a transmission loss value, as measured according to KS F 2080, of 10 dB or more.

For example, the automobile interior/exterior material may have a sound absorption rate of 0.4 to 1 NRC or 0.4 to 0.6 NRC and a sound insulation rate of 10 to 30 dB or 15 to 25 dB. As such, the automobile interior/exterior material according to the present invention may realize both excellent sound absorption performance and insulation performance, thereby efficiently insulating and/or absorbing noise inside and outside automobiles.

In an embodiment, the automobile interior/exterior material satisfies Equation 1 below:

$$(W_2-W_1)/W_1 \times 100 \leq 8(\%),$$ [Equation 1]

wherein $W_1$ denotes a flexural strength of the automobile interior/exterior material before exposure to ultraviolet radiation under conditions according to KS M ISO 11507, $W_2$ denotes a flexural strength of the automobile interior/exterior material after 30 days of exposure to ultraviolet radiation under conditions according to KS M ISO 11507, and the flexural strength denotes a strength (N/cm$^2$) at which, while applying flexural load at a rate of 5 mm/min to a specimen of the automobile interior/exterior material fixed to a support span of 100 mm according to ASTM D 790, the specimen is deformed by 10% with respect to an initial shape thereof.

In particular, Equation 1 may be used to calculate a flexural strength change rate of the automobile interior/exterior material according to the present invention. The flexural strength change rate may be obtained by calculating a flexural strength change rate between an initial flexural strength ($W_1$) of the automobile interior/exterior material before exposure to the outside and a later flexural strength ($W_2$) after 30 days of exposure to the outside.

In particular, the automobile interior/exterior material according to the present invention may have a flexural strength change rate of 8% or less, 0.01 to 7.5%, 0.1 to 6%, 0.4 to 5% or 0.5 to 2%, as calculated according to Equation 1. When the flexural strength change rate is within these ranges, the shape of the automobile interior/exterior material may be stably maintained and durability decrease thereof may be prevented, even when exposed to the outside for a long period of time.

By using the automobile interior/exterior material according to the present invention, excellent tensile strength and/or low combustibility may be realized. In an embodiment, the tensile strength may be 10 to 150 MPa according to ASTM D 638. For example, the tensile strength may be 10 to 130 MPa, 30 to 100 MPa, or 40 to 100 MPa according to ASTM D 638. When the tensile strength is within these ranges, excellent durability may be realized.

In addition, the automobile interior/exterior material may have a flame resistance of 80 or less according to KS M ISO 9772. In particular, the automobile interior/exterior material according to the present invention has flame retardant or non-flammable properties, thereby reducing the risk of combustion.

The automobile interior/exterior material according to the present invention has excellent durability. In particular, the automobile interior/exterior material may satisfy Equation 2 below after being subjected to severe conditions that include a step of allowing to sit at 90±1° C. for 24 hours; and a step of allowing to sit at a relative humidity of 90% and 50±1° C. for 24 hours:

$$|V_1-V_0|/V_0 \times 100 \leq 5\%$$ [Equation 2]

wherein $V_0$ denotes a volume (mm$^3$) of the automobile interior/exterior material before exposure to the severe conditions, and $V_1$ denotes a volume (mm$^3$) of the automobile interior/exterior material after exposure to the severe conditions.

In particular, a dimensional change rate of a manufactured automobile interior/exterior material sample before and after being subjected to severe conditions was measured. The dimensional change rate corresponds to a long-term dimensional change rate of the automobile interior/exterior material applied to an automobile. For example, the volume may be calculated by multiplying the length, width, and thickness of the automobile interior/exterior material. For example, the dimensional change rate calculated according to Equation 1 may be 0.01 to 5%, 0.01 to 3%, or 0.01 to 1%. It may be confirmed that, when the dimensional change rate according to Equation 1 is within these ranges, the automobile interior/exterior material according to the present invention is not deformed even if it is used for a long time in an environment with severe temperature change.

Here, when a value according to Equation 1 is greater than 5%, the automobile interior/exterior material may be easily peeled off, be swollen, sag, be discolored, or be deformed.

Hereinafter, the first polyester resin fiber forming the fiber layer according to the present invention is described in more detail.

The first polyester resin fiber is formed of a polyester resin including repeat units represented by Formulas 1 and 2 below and having a melting point of 180° C. to 250° C. or a softening point of 100° C. to 150° C.:

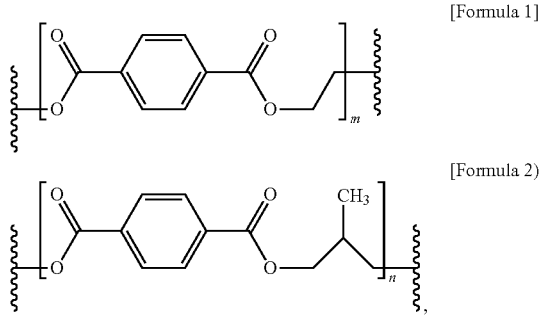

[Formula 1]

[Formula 2]

wherein m and n denote mole fractions of repeat units contained in a low-melting-point polyester resin, and
m+n=1 and n is 0.05 to 0.5.

The first polyester resin fiber may be a fiber of a low-melting-point polyester resin. The low-melting-point polyester resin may have a structure including repeat units represented by Formulas 1 and 2. The repeat unit of Formula 1 represents a repeat unit of polyethylene terephthalate (PET), and the repeat unit of Formula 2 serves to improve tear characteristics of a polyester resin including the repeat unit of polyethylene terephthalate (PET). In particular, since the repeat unit represented by Formula 2 has a space such that a main chain of a resin by polymerized propylene chain bonded to terephthalate with a methyl group (—CH$_3$), as a side chain rotates, increases in a freedom degree of the main chain and decrease in the crystallinity of the resin are induced, thereby lowering a melting point (Tm). This may provide the same effect as a conventional case in which isophthalic acid (IPA) containing an asymmetric aromatic ring is used to lower the melting point (Tm) of a crystalline polyester resin.

Here, the low-melting-point polyester resin may include the repeat unit of Formula 2, which lowers the melting point (Tm) of the resin, as a main repeat unit along with the repeat unit of Formula 1 including an ester repeat unit. In particular, the low-melting-point polyester resin of the present invention may include 0.5 to 1 of the repeat units represented by Formula 1 and 2 when a total mole fraction of the resin is 1. Particularly, the repeat units represented by Formula 1 and 2 may be included in an amount of 0.55 to 1; 0.6 to 1; 0.7 to 1; 0.8 to 1; 0.5 to 0.9; 0.5 to 0.85; 0.5 to 0.7; or 0.6 to 0.95.

In addition, the amount of the repeat unit represented by Formula 2 included in the low-melting-point polyester resin may be 0.05 to 0.5 when a total fraction including the repeat unit represented by Formula 1 is 1 (m+n=1). Particularly, the amount of the repeat unit represented by Formula 2 may be 0.05 to 0.4, 0.1 to 0.4, 0.15 to 0.35; or 0.2 to 0.3.

In addition, the low-melting-point polyester may have a melting point (Tm) of 180° C. to 250° C., or might not have a melting point. Particularly, the melting point (Tm) may be 180° C. to 250° C.; 185° C. to 245° C.; 190° C. to 240° C.; 180° C. to 200° C.; 200° C. to 230° C., or 195° C. to 230° C., or might not be present.

In addition, the low-melting-point polyester may have a softening point of 100° C. to 150° C., particularly a softening point of 100° C. to 130° C., 118° C. to 128° C.; 120° C. to 125° C.; 121° C. to 124° C.; 124° C. to 128° C., or 119° C. to 126° C.

Further, the low-melting-point polyester resin may have a glass transition temperature (Tg) of 50° C. or more. The glass transition temperature may be particularly 50° C. to 80° C., more particularly 61° C. to 69° C., 60° C. to 65° C., 63° C. to 67° C., 61° C. to 63° C., 63° C. to 65° C., 65° C. to 67° C., or 62° C. to 67° C.

In addition, the low-melting-point resin may have an intrinsic viscosity (I.V) of 0.5 dl/g to 0.75 dl/g. Particularly, the intrinsic viscosity (I.V) may be 0.6 dl/g to 0.65 dl/g; 0.65 dl/g to 0.70 dl/g; 0.64 dl/g to 0.69 dl/g; 0.65 dl/g to 0.68 dl/g; 0.67 dl/g to 0.75 dl/g; 0.69 dl/g to 0.72 dl/g; 0.7 dl/g to 0.75 dl/g; or 0.63 dl/g to 0.67 dl/g.

Since the low-melting-point polyester resin according to the present invention includes the repeat unit represented by Formula 2, a melting point (Tm), a softening point, and a glass transition temperature (Tg) may be controlled within the above ranges. A resin, the properties of which are controlled within the ranges, may exhibit excellent adhesiveness.

Meanwhile, the low-melting-point polyester resin may further include a repeat unit represented by Formula 3 below along with the repeat units represented by Formulas 1 and 2:

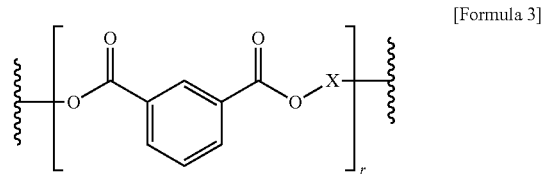

[Formula 3]

wherein X is a 2-methylpropylene group, an ethylene group, or an oxydiethylene group, and
r is 0.3 or less, as a mole fraction of a repeat unit contained in a low-melting-point polyester resin.

Particularly, r in Formula 3 may be 0.25 or less, 0.2 or less, 0.15 or less, or 0.1 or less.

By controlling the repeat unit represented by Formula 3 included in the low-melting-point polyester resin within the above fraction range according to the present invention, the melting point (Tm) of the polyester resin may be further lowered and the content of by-products, e.g., cyclic compounds having a polymerization degree of 2 to 3, generated during polymerization, may be significantly lowered.

In an embodiment, since the content of a cyclic compound having a polymerization degree 2 to 3 in the low-melting-point polyester resin according to the present invention is significantly decreased, the cyclic compound may be included in an amount of 1% by weight based on a total weight of the resin. Particularly, the cyclic compound may be included in an amount of 0.5% by weight or less, 0.4% by weight or less, 0.3% by weight or less, or 0.2% by weight or less based on a total weight of the resin, or the cyclic compound might not be included therein.

In another embodiment, any one or more of the first and second polyester resin fibers may be a modified cross-section hollow fiber. In the present invention, all of the second polyester resin fiber may be a modified cross-section hollow fiber, but only a portion thereof may be a modified cross-section hollow fiber. For example, when the second polyester resin fiber is a modified cross-section hollow fiber, 20 to 85% (v/v) of the second polyester resin fiber may be a modified cross-section hollow fiber. The modified cross-section hollow fiber may include a hollow portion, a shape retaining portion, and a volume control portion based on a cross-section thereof. Here, the volume control portion may protrude in a direction opposite to the center of the fiber. Particularly, the protruding end has a round shape.

Although the present invention describes the cross-sectional structure of the modified cross-section hollow fiber as having a hollow portion, a shape retaining portion, and a volume control portion, it is for convenience of explanation. Inside the cross-sectional structure of the modified cross-section hollow fiber, a hollow portion forming a hole along a longitudinal direction of the fiber is present. In addition, the cross-sectional structure includes a shape retaining portion enclosing the hollow portion. In addition, with respect to the cross-section of the shape retaining portion, bumps and depressions are formed on the outer circumferential surface at the opposite side of the hollow portion. Among the bumps and depressions, the bumps are referred to as a volume control portion. Using the modified cross-section hollow fiber, a mesh structure formed by the fiber is included. This mesh structure absorbs sound, thereby improving sound absorption performance.

As an embodiment, a process of preparing a low-melting-point polyester resin is described in detail below.

A method of preparing a low-melting-point polyester resin includes a step of performing transesterification of a mixture including polyethylene terephthalate (PET) and 2-methyl-1,3-propanediol.

The method of preparing the low-melting-point polyester resin according to the present invention may be performed by mixing a polyester polymer, which is prepared by polymerizing an aromatic dicarboxylic acid, such as phthalic acid, Terephthalic acid, or isophthalic acid (IPA), with a diol compound, such as ethylene glycol (EG), propylene glycol (PG), diethylene glycol (DEG), or dipropylene glycol (DPG), with 2-methyl-1,3-propanediol, and then performing transesterification of the resultant mixture according to a method generally performed in the art.

In an embodiment, the low-melting-point polyester resin may be prepared by mixing a polyethylene terephthalate oligomer (PET oligomer) with 2-methyl-1,3-propanediol and adding a catalyst for transesterification thereto, followed by performing transesterification at 250±10° C.

Here, 2-methyl-1,3-propanediol may be mixed in an amount of 5 moles to 50 moles based on 100 moles of polyethylene terephthalate (PET) as the polyester polymer. Particularly, 2-methyl-1,3-propanediol may be mixed in an amount of 5 moles to 40 moles; 10 moles to 30 moles; 20 moles to 40 moles; 25 moles to 50 moles; or 30 moles to 50 moles based on 100 moles of polyethylene terephthalate (PET). Since the contents of the additives for preparing a low-melting-point resin are controlled in the above ranges in the present invention, the problem that the melting point of a resin is not sufficiently lowered due to low contents of the additives or the crystallinity of a resin increases again beyond a critical point, at which the crystallinity is reduced, due to high contents of the additives may be prevented.

In addition, the transesterified mixture may further include any one or more of isophthalic acid (IPA) and diethylene glycol (DEG) along with polyethylene terephthalate (PET) and 2-methyl-1,3-propanediol. Particularly, the mixture may include polyethylene terephthalate (PET), 2-methyl-1,3-propanediol, and diethylene glycol (DEG), or polyethylene terephthalate (PET), 2-methyl-1,3-propanediol, diethylene glycol (DEG), and isophthalic acid (IPA).

Here, isophthalic acid (IPA) may be included in an amount of 30 moles or less based on 100 moles of polyethylene terephthalate (PET). More particularly, isophthalic acid (IPA) may be included in an amount of 25 moles or less, 20 moles or less, 15 moles or less, or 10 moles or less based on 100 moles of polyethylene terephthalate (PET). The content of isophthalic acid (IPA) may be 0.1 moles or more or 1 mole or more, or isophthalic acid (IPA) might not be included. For example, isophthalic acid (IPA) may be included in an amount of 0.5 to 0.001 moles.

In addition, diethylene glycol (DEG) may be included in an amount of 1 to 20 moles based on 100 moles of polyethylene terephthalate (PET). Particularly, diethylene glycol (DEG) may be included in an amount of 5 moles to 15 moles, 10 moles to 15 moles, 15 moles to 20 moles, 12 moles to 18 moles, 13 moles to 17 moles, or 14 moles to 16 moles based on 100 moles of polyethylene terephthalate (PET).

Since the content of isophthalic acid (IPA) is controlled within the above ranges in the present invention, manufacturing costs may be lowered and the content of a cyclic compound having a polymerization degree of 2 to 3 in a prepared low-melting-point polyester resin may be minimized. In addition, by controlling the content of diethylene glycol (DEG) within the above range, decrease in the glass transition temperature (Tg) may be significantly inhibited while optimizing the melting point (Tm) of the resin, thereby preventing aging occurring during spinning.

In an embodiment, the automobile interior/exterior material according to the present invention may include a resin foam layer and have a structure wherein a fiber layer is laminated on one or both surfaces of the resin foam layer. Particularly, the automobile interior/exterior material may have a structure including a polyester resin foam layer; and a polyester resin fiber layer formed on both surfaces of the polyester resin foam layer.

The polyester resin foam layer may have a foam board or foam sheet shape. Particularly, the automobile interior/exterior material has a structure wherein a polyester resin fiber layer is laminated on both surfaces of a polyester resin foam sheet.

For example, the automobile interior/exterior material according to the present invention may have a flexural elasticity modulus of 400 to 30,000 MPa, measured when a flexural load is applied, at a rate of 5 mm/min, to a specimen of the automobile interior/exterior material fixed to a support span of 100 mm according to ASTM D 790. The automobile interior/exterior material according to the present invention may provide excellent flexural elasticity, thereby preventing sagging and providing excellent durability when applied to automobile interior/exterior material.

For example, the polyester resin foam layer may be a polyethylene terephthalate (PET) foam sheet, and the fiber layer may be a polyethylene terephthalate fiber. By forming some or all of the components and constituting the laminate with a PET-based resin, interlayer adhesion may be increased and there is an environmental advantage in that the resin may be easily regenerated.

In addition, the automobile interior/exterior material may have a mass per unit area, i.e., a basis weight, of 300 to 3,000 g/m² on average. For example, the automobile interior/exterior material may have a mass per unit area of 500 to 1,500 g/m², 600 to 1100 g/m², or 800 to 900 g/m². Within this basis weight range, the automobile interior/exterior material according to the present invention may realize weight reduction.

The automobile interior/exterior material according to the present invention may be utilized in interior parts of automobiles or interior materials. In particular, the automobile interior/exterior material may be any one or more of a floor under cover, an engine room cover, a trunk lining material, and a tray package panel.

For example, by applying the interior material according to the present invention to a floor under cover or engine room cover of an automobile, particularly by installing the interior material at the bottom of an engine, transmission, cooling pan, or the like of an automobile, the engine, the transmission, or the like may be effectively protected from external impact. Alternatively, when the interior material for automobile trunks according to the present invention is used as a trunk lining material, it may be applied to a trunk room partition panel, a trunk room right and left trim panel, a trunk room covering panel, a trunk room door panel, or the like.

In addition, the present invention provides a method of manufacturing the aforementioned automobile interior/exterior material.

In an embodiment, the method of manufacturing the automobile interior/exterior material includes a step of thermoforming a fiber layer including a first polyester resin fiber having a melting point of 180° C. to 250° C. or a softening point of 100° C. to 150° C.; and a second polyester resin fiber having a melting point of 255° C. or more at 80 to 200° C.

The fiber layer is a mixture of the first polyester resin fiber and the second polyester resin fiber. A mixing ratio of the first polyester resin fiber to the second polyester resin fiber may be 1:9 to 9:1 by weight. As needed, the mixing ratio may be 1:9 to 7:3, or 1:9 to 5:5. By using a mixture of the low-melting-point polyester resin and the high-melting-point polyester resin, strength may be reinforced while increasing adhesion among fibers. Particularly, the content of the low-melting-point polyester resin fiber may be adjusted to be the same as or lower than that of the high-melting-point polyester resin fiber. For example, the melting point of the high-melting-point polyester resin may be higher than 250° C. and may be particularly 251 to 260° C. The high-melting-point polyester resin is commercially available. For example, a product (product name: SD, Semi-dull chip) manufactured by Huvis Inc. may be used.

An automobile interior/exterior material manufactured according to the method satisfies Equation 1 below. Equation 1 has been described above:

$$(W_2-W_1)/W_1 \times 100 \leq 8(\%),$$ [Equation 1]

wherein $W_1$ denotes a flexural strength of the automobile interior/exterior material before exposure to ultraviolet radiation under conditions according to KS M ISO 11507, $W_2$ denotes a flexural strength of the automobile interior/exterior material after 30 days of exposure to ultraviolet radiation under conditions according to KS M ISO 11507, and the flexural strength denotes a strength (N/cm²) at which, while applying flexural load at a rate of 5 mm/min to a specimen of the automobile interior/exterior material fixed to a support span of 100 mm according to ASTM D 790, the specimen is deformed by 10% with respect to an initial shape thereof.

In addition, an automobile interior/exterior material manufactured according to the method satisfies property conditions (sound insulation property) such as a sound absorption rate, as measured according to KS F 2805, of 0.4 NRC or more, and/or a transmission loss value, as measured according to KS F 2080, of 10 dB or more. Descriptions of a sound absorption rate and a sound insulation property are provided above.

In particular, the first polyester resin fiber includes repeat units represented by Formulas 1 and 2 below:

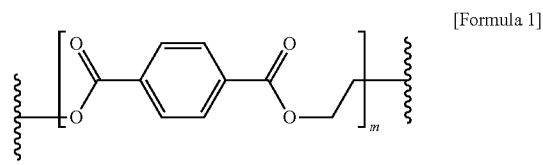

[Formula 1]

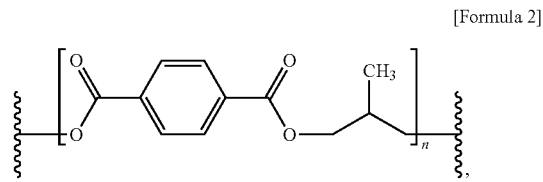

[Formula 2]

wherein m and n denote mole fractions of repeat units contained in the low-melting-point polyester resin, and
m+n=1 and n is 0.05 to 0.5.

The thermoforming step may be controlled within a range within which the low-melting-point polyester resin, as the first polyester resin fiber, is partially melted. For example, the thermoforming step may be performed at 100 to 150° C. In addition, in the thermoforming step, a pressure higher than atmospheric pressure is applied. Molding may be performed in a desired shape under a condition in which heat and pressure are simultaneously applied. The applied pressure is not specifically limited and, for example, may be 1.5 to 10 atm, 2 to 5 atm.

In an embodiment, after the thermoforming step, a step of sequentially laminating the first polyester resin fiber layer; the polyester resin foam layer; and the second polyester resin fiber layer may be further included. In the present invention, sound insulation property and strength may be reinforced by introducing the polyester resin foam layer. The polyester resin foam may have a board or sheet shape.

As needed, before the thermoforming step, a step of forming a laminate by sequentially laminating the first polyester resin fiber layer; the polyester resin foam layer; and the second polyester resin fiber layer may be included. In this case, in the thermoforming step, the laminate including the first polyester resin fiber layer; the polyester resin foam layer; and the second polyester resin fiber layer is thermally formed, thereby being processed into a desired shape.

The present invention discloses a structure wherein the first polyester resin fiber layer; the polyester resin foam layer; and the second polyester resin fiber layer are sequentially laminated. Although the case wherein the polyester resin foam layer is exposed to an outer layer is not excluded, in this case, sound absorption property may be deteriorated. The first and second polyester resin fiber layers correspond to the aforementioned polyester resin fiber layer. In addition, description of the polyester resin foam layer is provided above.

For example, all of the first and second polyester resin fiber layers and the polyester resin foam layer may be formed of a polyethylene terephthalate (PET) resin.

[Mode for Invention]

Hereinafter, the present invention will be described in detail by explaining examples and experimental examples of the invention.

However, these examples and experimental examples are provided for illustrative purposes only and should not be construed as limiting the scope and spirit of the present invention.

Preparation Examples 1 to 24: Preparation of Low-Melting-Point Polyester Resin Fiber Terephthalic acid (TPA) and isophthalic acid (IPA), as acidic ingredients; and 2-methyl-1,3-propanediol (MPD), ethylene glycol (EG), and diethylene glycol (DEG) as alcoholic ingredients were mixed in molar ratios, summarized in Table 1, in an esterification tank, and a general catalyst for esterification was added thereto, followed by performing esterification at 250±5° C. When an esterification rate reached about 96%, esterification was terminated, a catalyst for condensation polymerization was added thereto, followed by performing condensation polymerization such that a final temperature and vacuum pressure of the tank respectively reached 280±5° C. and 0.1 mmHg. The viscosity of a resultant resin was measured using a stirrer torque meter. When a desired viscosity was obtained, condensation polymerization was terminated. In this manner, the viscosity of a resin may be adjusted.

The tank was slowly depressurized and pressurized to discharge the resin to the outside of the tank. The discharged resin was cooled, and cut into a pellet shape to measure the properties of the resin. The obtained resin was co-spun into a sheath-core shape. The prepared resin was flowed into the sheath portion, and general polyethylene terephthalate (PET) was flowed into the core portion, thereby preparing the first polyester resin fiber as a low-melting-point resin fiber.

The contents of added ingredients of each example were varied as summarized in Table 1 below.

TABLE 1

| Preparation Example No. | Acidic ingredient (mol %) | | Diol ingredient (mol %) | | |
|---|---|---|---|---|---|
| | IPA | TPA | MPD | DEG | EG |
| 1 | 0 | 100 | 40 | 0 | 60 |
| 2 | 15 | 85 | 30 | 0 | 70 |
| 3 | 5 | 95 | 30 | 0 | 70 |
| 4 | 0 | 100 | 30 | 0 | 70 |
| 5 | 0 | 100 | 30 | 15 | 55 |
| 6 | 0 | 100 | 25 | 15 | 60 |
| 7 | 10 | 90 | 20 | 0 | 80 |
| 8 | 10 | 90 | 20 | 10 | 70 |
| 9 | 10 | 90 | 20 | 15 | 65 |
| 10 | 0 | 100 | 20 | 0 | 80 |
| 11 | 0 | 100 | 20 | 20 | 60 |
| 12 | 0 | 100 | 15 | 25 | 60 |
| 13 | 20 | 80 | 10 | 15 | 75 |
| 14 | 0 | 100 | 10 | 0 | 90 |
| 15 | 40 | 60 | 0 | 0 | 100 |
| 16 | 35 | 65 | 0 | 10 | 90 |
| 17 | 30 | 70 | 0 | 0 | 100 |
| 18 | 30 | 70 | 0 | 15 | 85 |

TABLE 1-continued

| Preparation Example No. | Acidic ingredient (mol %) | | Diol ingredient (mol %) | | |
|---|---|---|---|---|---|
| | IPA | TPA | MPD | DEG | EG |
| 19 | 20 | 80 | 0 | 0 | 100 |
| 20 | 20 | 80 | 0 | 15 | 85 |
| 21 | 20 | 80 | 0 | 20 | 80 |
| 22 | 15 | 85 | 0 | 25 | 75 |
| 23 | 10 | 90 | 0 | 0 | 100 |
| 24 | 0 | 100 | 0 | 30 | 70 |

Experimental Example 1

The properties of a sample prepared according to each of Preparation Examples 1 to 24 were evaluated by the following items. Evaluation results are summarized in Table 2 below.

(1) Cyclic Compound Content Measurement 10 mg of polyester resin was injected into a Pyrex tube having a diameter of 5 mm and a length of 20 cm until it was dissolved in trifluoroacetic acid (TFA) solvent to a height of about 5 cm. The $^1$H-NMR spectrum was measured using a nuclear magnetic resonance spectrometer (NMRS, Bruker). Based on the measured result, the content of a cyclic compound having a polymerization degree of 2 to 3 remaining in the low-melting-point resin was derived.

(2) Measurement of Softening Temperature, Melting Point (Tm) and Glass Transition Temperature (Tg)

The melting point (Tm) and glass transition temperature (Tg) of the low-melting-point polyester resin were measured using a differential scanning calorimeter (DSC-7, Perkin Elmer). When a heat absorption peak was not observed upon measurement of the melting point (Tm), softening behavior was observed in a TMA mode using a dynamic mechanical analyzer (DMA-7, Perkin Elmer).

(3) Measurement of Intrinsic Viscosity (I.V) and Melt Viscosity

A polyester resin was dissolved at a concentration of 0.5% by weight in a mixture of phenol and tetrachloroethane mixed in a weight ratio of 1:1, and then the intrinsic viscosity (I.V) thereof was measured at 35° C. using an Ubbelohde viscometer. In addition, the melt viscosity thereof was measured using a general method.

TABLE 2

| Preparation Example No. | Cyclic compound [% by weight] | Softening temperature [° C.] | Tm [° C.] | Tg [° C.] | IV (dl/g) | Melt viscosity (Poise) |
|---|---|---|---|---|---|---|
| 1 | 0 | 120 | — | 70.4 | 0.581 | 913.0 |
| 2 | 0.25 | 110 | — | 68.0 | 0.581 | 853.0 |
| 3 | 0 | — | 178 | 68.0 | 0.580 | 847.0 |
| 4 | 0 | — | 196.3 | 72.1 | 0.582 | 851.0 |
| 5 | 0 | 118 | — | 60.8 | 0.580 | 864.0 |
| 6 | 0 | 121 | — | 63.5 | 0.582 | 847.0 |
| 7 | 0.2 | — | 181 | 70.0 | 0.582 | 811.0 |
| 8 | 0.19 | 120 | — | 62.0 | 0.579 | 815.0 |
| 9 | 0.17 | 115 | — | 60.7 | 0.582 | 831.0 |
| 10 | 0 | — | 210.5 | 74.6 | 0.583 | 818.0 |
| 11 | 0 | 129 | — | 61.4 | 0.581 | 811.0 |
| 12 | 0 | — | 176 | 55.7 | 0.581 | 781.0 |
| 13 | 0.36 | 125 | — | 60.5 | 0.579 | 754.0 |
| 14 | 0 | — | 235.3 | 76.5 | 0.581 | 736.0 |
| 15 | 0.86 | 128 | — | 70.1 | 0.580 | 673.0 |
| 16 | 0.73 | 108 | — | 67.1 | 0.581 | 654.0 |
| 17 | 0.73 | — | 195.2 | 71.0 | 0.582 | 687.0 |
| 18 | 0.53 | 112 | — | 61.0 | 0.579 | 659.0 |

TABLE 2-continued

| Preparation Example No. | Cyclic compound [% by weight] | Softening temperature [° C.] | Tm [° C.] | Tg [° C.] | IV (dl/g) | Melt viscosity (Poise) |
|---|---|---|---|---|---|---|
| 19 | 0.41 | — | 208.6 | 71.6 | 0.580 | 677.0 |
| 20 | 0.39 | — | 178 | 63.0 | 0.581 | 697.0 |
| 21 | 0.32 | 119 | — | 63.0 | 0.582 | 643.0 |
| 22 | 0.27 | 125 | — | 60.0 | 0.581 | 657.0 |
| 23 | 0.25 | — | 232.5 | 74.2 | 0.583 | 687.0 |
| 24 | 0 | — | 199.7 | 57.7 | 0.581 | 690.0 |

As shown in Table 2, it can be confirmed that a cyclic compound content in the fiber layer resin forming the automobile interior/exterior material according to the present invention is 1% by weight or less, particularly 0 to 0.86% by weight. In addition, it can be confirmed that the resin has a melting point of 180° C. to 250° C. or a softening point of 100° C. to 150° C. The intrinsic viscosity (I.V) corresponds to 0.5 dl/g to 0.75 dl/g. The intrinsic viscosity (I.V) is particularly 0.55 dl/g to 0.6 dl/g. In addition, it can be confirmed that the glass transition temperature is 50° C. to 80° C., particularly 57 to 77° C.

Examples 1 to 24: Preparation of Fiber Layer

The first polyester resin fiber prepared according to each of Preparation Examples 1 to 24 was mixed with a second polyester resin fiber having a melting point of 255° C. or more, and thermoforming was performed while pressing at 130° C. As a result, a fiber layer was formed.

The second polyester resin fiber was prepared in the same manner as in Preparation Example 1 using a product (product name: SD, Semi-dull chip) manufactured by Huvis Inc.

A mixing ratio of the first polyester resin fiber to the second polyester resin fiber is based on parts by weight, and is summarized in Table 3 below.

TABLE 3

| Example No. | First polyester resin fiber content | Second polyester resin fiber content |
|---|---|---|
| 1~5 | 3.5 | 6.5 |
| 6~10 | 4 | 6 |
| 11~15 | 5 | 5 |
| 16~20 | 6 | 4 |
| 21~24 | 7 | 3 |

Experimental Example 2

The flexural strength ($W_1$) before exposure to ultraviolet radiation of the sample according to each of Examples 1 to 5 was measured under conditions according to KS M ISO 11507. Next, the sample was exposed to ultraviolet radiation under the same conditions and, after 30 days of exposure to ultraviolet radiation, the flexural strength ($W_2$) thereof was measured.

The flexural strength denotes a strength (N/cm²) at which, while applying flexural load at a rate of 5 mm/min to a specimen of the automobile interior/exterior material fixed to a support span of 100 mm according to ASTM D 790, the specimen is deformed by 10% with respect to an initial shape thereof.

A change rate of the measured flexural strength was calculated, and is summarized in Table 4.

TABLE 4

| Example No. | Flexural strength (MPa) change rate (%) |
|---|---|
| Example 1 | 1.2 |
| Example 2 | 1.3 |
| Example 3 | 1.5 |
| Example 4 | 1.1 |
| Example 5 | 1.3 |

Referring to Table 4, it was confirmed that the automobile interior/exterior materials according to the examples had minimized flexural strength change in an ultraviolet radiation exposure environment and, accordingly, had excellent durability.

Experimental Example 3

The basis weight, flexural modulus (stiffness), and flexural strength of the fiber layer sample manufactured according to Example 1 were measured.

The flexural modulus and flexural strength were measured while applying flexural load at a rate of 5 mm/min to the specimen fixed to a support span of 100 mm according to ASTM D 790. Results are summarized in Table 5 below.

TABLE 5

| Classification | Example 1 |
|---|---|
| Basis weight (g/m²) | 980 |
| Flexural modulus (MPa) | 450 |
| Flexural strength (MPa) | 12 |

The basis weight of the sample according to each of Examples 2 to 25 was measured in the same manner as in Table 5. As a result, all of the samples were confirmed to have a basis weight of 1,000 g/m² or less.

In addition, it was confirmed that the flexural moduli of the samples according to Examples 2 to 25 were ±10%, compared to that of the sample according to Example 1.

Experimental Example 4: Dimensional Change Rate Evaluation

The sample according each of Examples 11 to 13 was subjected to a dimensional change rate measurement experiment. In particular, the prepared automobile interior material was subjected to severe conditions including a step of allowing the automobile interior material to sit at 90±1° C. for 24 hours; and a step of allowing the automobile interior material to sit at a relative humidity of 90% and 50±1° C. for 24 hours, and then a dimensional change rate thereof was measured according to Equation 1 below. Results are summarized in Table 6 below.

$$|V_1 - V_0|/V_0 \times 100 \qquad \text{[Equation 1]}$$

wherein $V_0$ denotes the volume (mm³) of an automobile interior material before exposure to severe conditions, and $V_1$ denotes the volume (mm³) of an automobile interior material after exposure to severe conditions.

TABLE 6

| Example No. | Dimensional change rate (%) |
|---|---|
| Example 11 | 0.5 |
| Example 12 | 0.3 |
| Example 13 | 0.2 |

Referring to Table 6, it was confirmed that the automobile interior/exterior material according to the present invention exhibited a low dimensional change rate of 0.5% or less. From this result, it can be confirmed that the automobile interior material according to the present invention has excellent durability.

Experimental Example 5: Sound Absorption and Insulation Performance Measurement

A sound absorption rate and a sound insulation rate of the sample according to each of Examples 16 to 18 were measured. Measurement methods thereof are disclosed below, and results are summarized in Table 7 below.

(1) Sound Absorption Rate Measurement

A sound absorption rate at 0 to 10,000 Hz was measured using the KS F 2805 reverberation method, and a noise reduction coefficient (NRC) was calculated. NRC denotes an average sound absorption rate at 250, 500, 1,000 and 2,000 Hz.

(2) Sound Insulation Rate Measurement

Transmission loss values of frequencies of 1 to 8,000 Hz were determined using Apamat measurement equipment according to KS F 2862. In addition, for comparison, transmission loss values at 8,000 Hz were compared.

TABLE 7

| Example No. | Sound absorption rate (NRC) | Sound insulation rate (dB) |
| --- | --- | --- |
| Example 16 | 0.4 | 11 |
| Example 17 | 0.4 | 14 |
| Example 18 | 0.4 | 18 |

Referring to Table 7, it can be confirmed that the fiber layer according to the present invention has both excellent sound absorption rate and sound insulation rate.

Experimental Example 6: Evaluation of Tensile Strength and Combustibility

The tensile strength and combustibility of the sample according to each of Examples 1 to 24 were evaluated. The tensile strength was evaluated according to ASTM D 638, and the combustibility was evaluated according to KS M ISO 9772.

As evaluation results, it was confirmed that the samples according to Examples 1 to 25 had a tensile strength of 70 MPa or more and a combustibility of 70 or less.

Examples 25 to 27

The fiber layer according to each of Examples 5 to 7 was laminated on both surfaces of a PET resin foam sheet. In particular, the PET resin foam sheet was prepared according to the following processes.

First, 100 parts by weight of a polyethylene terephthalate (PET) resin was dried at 130° C. to remove moisture therefrom. 1 part by weight of pyromellitic dianhydride, 1 part by weight of talc, and 0.1 parts by weight of Irganox (IRG 1010) were mixed based on 100 parts by weight of the PET resin, from which moisture had been removed, in a first extruder, followed by heating to 280° C. As a result, a resin melt was prepared. Next, carbon dioxide gas and pentane, as foaming agents, were mixed in a ratio of 5:5 in the first extruder, and 5 parts by weight of the mixture was added to 100 parts by weight of the PET resin, followed by extrusion and foaming. As a result, a polyester resin foam layer was prepared. The prepared polyester resin foam layer had a density of about 300 kg/m$^3$, a thickness of about 2 mm, and a basis weight of about 600 g/m$^2$.

Here, resultant laminates were prepared to a total thickness of 8 mm, and the masses per unit area thereof were adjusted as disclosed in Table 8 below.

TABLE 8

| Example No. | Mass per unit area (g/m$^2$) |
| --- | --- |
| Example 25 | 1,500 |
| Example 26 | 1,700 |
| Example 27 | 2,000 |

Referring to Table 8, it can be confirmed that the mass per unit area is 1500 to 2000 g/m$^2$.

INDUSTRIAL APPLICABILITY

The automobile interior/exterior material according to the present invention may realize excellent processability without deterioration of properties such as strength and durability and may be utilized in various shapes.

The invention claimed is:

1. An automobile interior/exterior material, comprising a polyester fiber layer that comprises a first polyester resin fiber having a glass transition temperature of 50° C. to 80° C. or a softening point of 100° C. to 150° C.; and a second polyester resin fiber having a melting point higher than 250° C.,
    wherein the polyester fiber layer has a flexural elasticity modulus of 450 MPa±10%, measured when a flexural load is applied at a rate of 5 mm/min, to a specimen of the automobile interior/exterior material fixed to a support span of 100 mm according to ASTM D 790,
    wherein a mixing ratio between the first and second polyester resin fibers constituting the polyester fiber layer is 1:9 to 9:1 by weight, and fibers forming the fiber layer are partially fused thereamong,
    wherein the first polyester resin fiber has an intrinsic viscosity (I.V) of 0.5 dl/g to 0.75 dl/g,
    wherein the content of a cyclic compound having a polymerization degree 2 to 3 in the first polyester resin fiber is in an amount of 1% by weight or less,
    wherein the first polyester resin fiber is prepared from a composition comprising acidic ingredients and diol ingredients,
    wherein the acidic ingredients comprise terephthalic acid, and the diol ingredients comprise ethylene glycol (EG) and 2-methyl-1,3-propanediol (MPD), and
    wherein, based on total moles of diol ingredients, said ethylene glycol (EG) and 2-methyl-1,3-propane diol (MPD) are used in an amount ranging from 55 to 90 mol % and 10 to 40 mol %, respectively, and
    wherein the fibers present in the polyester fiber layer consists of the first polyester resin fiber and the second polyester resin fiber.

2. The automobile interior/exterior material according to claim 1, wherein the acidic ingredients further comprise isophthalic acid, and wherein, based on total moles of acidic ingredients, said isophthalic acid is used in an amount of 30 mol % or less.

3. The automobile interior/exterior material according to claim 1, wherein the polyester fiber layer has a basis weight of 300 to 3,000 g/m$^2$ on average.

4. The automobile interior/exterior material according to claim 1, wherein the automobile interior material has a structure comprising a polyester resin foam layer; and the fiber layers formed on both surfaces of the polyester resin foam layer.

5. The automobile interior/exterior material according to claim 4, wherein the polyester resin foam layer is a polyethylene terephthalate (PET) foam sheet, and the fiber layers are a polyethylene terephthalate fiber.

6. A method of manufacturing an automobile interior/exterior material according to claim 1, the method comprising a step of thermoforming a polyester fiber layer comprising 10 to 90 parts by weight of a first polyester resin fiber having a glass transition temperature of 50° C. to 80° C. or a softening point of 100° C. to 150° C.; and 90 to 10 parts by weight of a second polyester resin fiber having a melting point of 255° C. or more at 80 to 200° C., wherein the first polyester resin fiber has an intrinsic viscosity (I.V) of 0.5 dl/g to 0.75 dl/g, wherein the content of a cyclic compound having a polymerization degree 2 to 3 in the first polyester resin fiber is in an amount of 1% by weight or less, and wherein the polyester fiber layer has a flexural elasticity modulus of 450 MPa±10%, measured when a flexural load is applied at a rate of 5 mm/min, to a specimen of the automobile interior/exterior material fixed to a support span of 100 mm according to ASTM D 790, wherein the first polyester resin fiber is prepared from a composition comprising acidic ingredients and diol ingredients, wherein the acidic ingredients comprise terephthalic acid, and the diol ingredients comprise ethylene glycol (EG) and 2-methyl-1,3-propanediol (MPD), and wherein, based on total moles of diol ingredients, said ethylene glycol (EG) and 2-methyl-1,3-propane diol (MPD) are used in an amount ranging from 55 to 90 mol % and 10 to 40 mol %, respectively, and wherein the fibers present in the polyester fiber layer consists of the first polyester resin fiber and the second polyester resin fiber.

7. The method according to claim 6, further comprising: after or before the thermoforming step, a step of sequentially laminating the first polyester resin fiber layer; the polyester resin foam layer; and the second polyester resin fiber layer.

8. The automobile interior/exterior material according to claim 1, wherein based on total moles of diol ingredients, said ethylene glycol (EG) and 2-methyl-1,3-propanediol (MPD) are used in an amount ranging from 60 to 80 mol % and 20 to 40 mol %, respectively.

9. The automobile interior/exterior material according to claim 1, wherein the diol ingredients further comprise diethylene glycol, and wherein, based on total moles of diol ingredients, said diethylene glycol is used in an amount of 20 mol % or less.

* * * * *